United States Patent [19]

Welterlin

[11] Patent Number: 4,633,149

[45] Date of Patent: Dec. 30, 1986

[54] BRUSHLESS DC MOTOR

[75] Inventor: Raymond E. Welterlin, Cary, N.C.

[73] Assignee: Buehler Products, Inc., Raleigh, N.C.

[21] Appl. No.: 774,752

[22] Filed: Sep. 10, 1985

[51] Int. Cl.$^4$ .............................................. H02K 29/08
[52] U.S. Cl. .................................... 318/254; 318/138;
318/439; 310/68 R
[58] Field of Search ................... 318/138, 254 A, 254,
318/439; 310/46, 68 R, 156, 198, 268

[56] References Cited

U.S. PATENT DOCUMENTS

| | | | |
|---|---|---|---|
| 3,539,817 | 11/1970 | Darrieus | 310/268 X |
| 4,072,881 | 2/1978 | Ban | 318/138 |
| 4,330,727 | 5/1982 | Oudet | 310/43 X |
| 4,551,645 | 11/1985 | Takahashi et al. | 310/156 X |
| 4,568,847 | 2/1986 | Schmider | 310/268 |
| 4,568,862 | 2/1986 | Tassinario | 310/68 R X |

FOREIGN PATENT DOCUMENTS

| | | | |
|---|---|---|---|
| 2360210 | 6/1974 | Fed. Rep. of Germany | 310/268 |
| 55-106068 | 8/1980 | Japan | 310/268 |
| 57-151263 | 9/1982 | Japan | 310/268 |

Primary Examiner—William M. Shoop, Jr.
Assistant Examiner—Bentsu Ro
Attorney, Agent, or Firm—Mason, Fenwick & Lawrence

[57] ABSTRACT

An axial air gap sub-fractional horsepower brushless DC motor of the pancake type including a rotor assembly having a disc-like annular cylindrical permanent magnet supported on a shaft, the magnet having plural pairs of axially magnetized magnetic poles, and a stator formed of two identical stator component sub-assemblies located on opposite sides of the permanent magnet each including a thin disc-like annular backing plate of soft magnetic material, a plurality of coils supported thereon arranged in a circular path forming an odd number of coils, and a hall effect sensing element located along the circular path between one pair of circumferentially adjacent coils. A pair of generally cup shaped housing halves of similar configuration are assembled on opposite sides of the rotor and the pair of identical stator component sub-assemblies for encasing the rotor and said stator component sub-assemblies therein.

9 Claims, 7 Drawing Figures

BRUSHLESS DC MOTOR

BACKGROUND AND OBJECTS OF THE INVENTION

The present invention relates in general to brushless DC motors of the so-called pancake type designed primarily for electronic computers, entertainment and medical aid devices, and similar densely packed electronic products, and more particularly to axial air gap sub-fractional horsepower brushless DC motors having two phases, a disc rotor, surface-wound windings, and an integral dry circuitry.

Heretofore, prior art brushless DC motors have centered around radial air gap designs using a permanent magnet on the rotor and windings on the stator. The rotor may be rotating either inside or outside the stator.

Axial air gap brushless motors are considered to be limited to computer disc drive applications where the pancake shape is most desirable. These applications call for the motor to overcome a friction load at very constant speed, usually below 1,000 rpm. The rotating permanent magnet is usually secured inside a cup made of soft magnetic material and serving as the flux return path. The additional inertia of the cup assists filtering of the speed variations and therefore provides a desirable feature. However, the cup prevents the motor from being used in higher performance applications because of poor acceleration. Poor efficiency at higher speeds is a second drawback. The surface-wound windings are secured on thin disc-like annular backing plate of soft magnetic material which generates eddy-currents when the magnet rotates. Eddy-currents are an undesirable effect which, along with hysteresis losses, manifests itself in iron power losses. The mathematical expression of eddy-current losses is $P = \sigma f^2 B^2$ where $\sigma$ is a coefficient depending on the magnetic quality of the steel and the thickness of the lamination, f is the number of flux changes per second and B is the flux density. As can be seen from the equation, at low speed, eddy-current related power losses are low. At high speed, eddy-current related power losses make this motor design particularly unattractive. Higher performance applications of brushless DC motors usually feature a radial, rather than an axial, design where standard well-known means of correcting these two drawbacks can be implemented.

An object of the present invention is to provide a brushless DC motor design for high performance applications which overcomes the above mentioned problems and still provides the pancake-like form arrangement. This form arrangement is very useful in today's densely packed electronic products used in computer peripherals, entertainment and medical aid devices, and the like. In addition to its useful shape, the pancake-like motor also provides high output power versus volume or mass.

Electric motors based on the axial concept and operating at high speed are already available in many versions. Some use an ironless disc armature and others use a disc magnet. U.S. Pat. No. 4,330,727 discloses a step motor having a disc magnet on the rotor and two groups of elementary magnetic circuits coupled with a coil on the stator. Such an arrangement could be provided with position sensing devices for controlling the commutation of current in the windings, but due to the generally high number of pole pairs of a stepper motor, this would be rather difficult. The angular displacement of the sensing element in the motor would be extremely critical since one has to create an accurate commutation angle for each magnetic phase and within each electrical cycle, in order to obtain a smoothly running brushless DC motor featuring the highest possible torque. The two groups of elementary magnetic circuits are ideal for creating detent torque in a step motor, but are not a desirable feature in a brushless DC motor which has to operate without cogging. U.S. Pat. No. 4,072,881 discloses an axial air gap brushless motor including a rotor assembly having a disc-like permanent magnet and a stator formed of two groups of armature coils located on opposite sides of the permanent magnet. The armature coils are dipped inside grooves formed on the inner surface of the backing plate made of soft ferrite material. As the preferred embodiment description explains, the dipping of the armature coils into the grooves by about a half of the thickness of the armature coil still results in some amount of cogging torque. Disc shaped silicon steel plates are then suggested to replace the soft ferrite backing material in order to eliminate the cogging and obtain a smooth rotational torque. However, this solution is not retained because of the eddy-current power loss drawback mentioned above.

Another object of the present invention is the provision of a brushless DC motor of an axial design built for high acceleration and high speed, which will overcome the problems of the computer disc drive brushless motor by exhibiting a disc like magnet rotating in an air gap formed by two surface wound stator assemblies placed on either side of the magnet. Hereby the inertia of the rotor is reduced to the minimum possible, allowing high acceleration. This overcomes the problems of the step motor design by featuring a low number of cycles per revolution, typically four, and by using surface wound stator assemblies which do not create any cogging torque. The advantages of the design combine high acceleration and the absence of cogging torque with low electrical and mechanical time constants and with a linear torque versus current characteristic, so that the motor will not be limited by magnetic saturation but only by its thermal capabilities. The winding arrangement in this motor allows placement of two magnetic phases with its windings and sensing element within a motor housing of very short length and using the space available in an optimum fashion. As to the problem of eddy-current power losses in the stationary backing plates, the present invention offers a twofold novel solution to create in a disc shaped plate made of soft magnetic material an electrical open circuit which prevents eddy-currents from circulating and which does not induce cogging torque.

Other objects, advantages and capabilities of the present invention will become apparent in the following detailed description, taken in conjunction with the accompanying drawing illustrating a preferred embodiment of the invention.

DETAILED DESCRIPTION OF A PREFERRED EMBODIMENT

Figure 1:
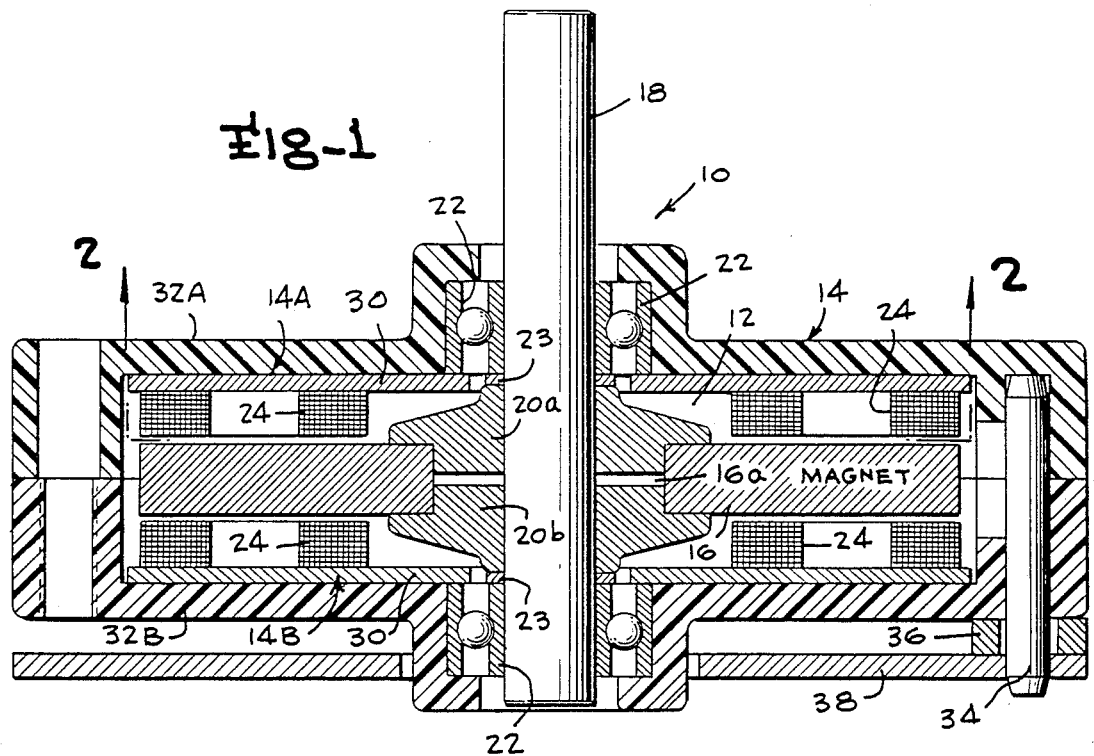
FIG. 1 is a vertical cross sectional view of a brushless DC motor constructed in accordance with the present invention.

Referring to the drawings, wherein like reference characters designate corresponding parts throughout the several figures, the brushless DC motor of the present invention is indicated generally by the reference character 10 and comprises a rotor 12 and a stator 14. The motor design features two magnetic phases on the stator 14 and four pole pairs on the rotor 12. The rotor 12 is formed of a disc-like permanent magnet 16 of annular cylindrical configuration secured to a shaft 18 by two identical flanges 20a, 20b gripping the annular magnet 16 in the region immediately adjacent to the magnet inner diameter or radially innermost edge portion 16a. The permanent magnet 16 is typically of neodymium-iron boron or rare-earth cobalt or strontium ferrite material, featuring a high coercive force and an essentially straight demagnetization curve in the second quadrant of the B-H characteristic. The magnet 16 is provided with eight magnetic poles of alternating polarity and axially magnetized. The rotor 12 is journaled in ball bearings 22 supporting the shaft 18. The rotor shaft 18 is to be coupled to a computer disc or other equipment's rotating device to transmit torque from the rotor shaft 18 in a known manner. A spacer 23 is placed between each of the rotor flanges 20a, 20b and the inner race member of the adjacent associated ball bearing assembly 22 and by this arrangement will take out the axial play and place the magnet 16 in the middle of the air gap.

Figure 2:
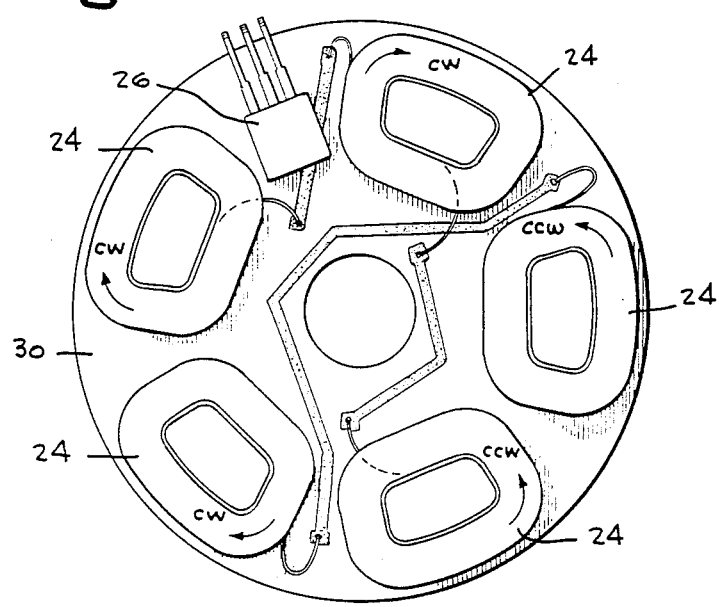
FIG. 2 is a top plan view of one of the plural winding, sensor and support plate assemblies, two of which are used in the motor, taken along a plane transverse to the motor shaft axis, along the line 2—2 of FIG. 1.
Figure 3:
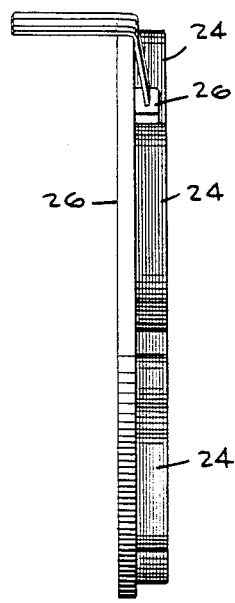
FIG. 3 is a side elevational view of the assembly of FIG. 2.
Figure 4A:
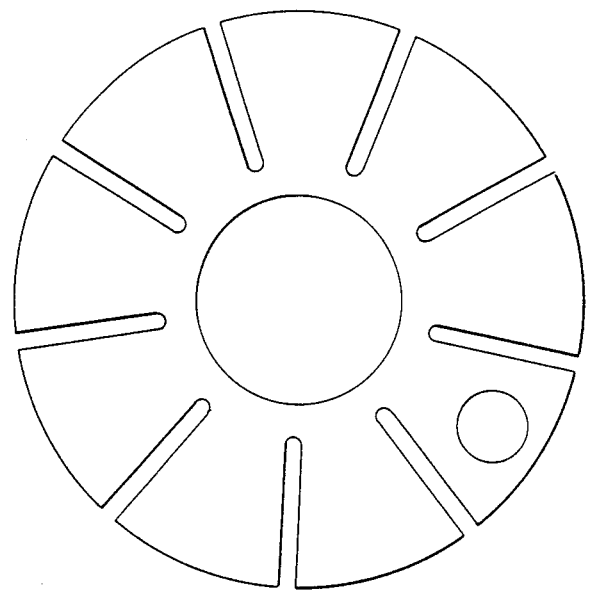
FIGS. 4a and 4b are a top plan views of a back plate in either construction of the preferred embodiment; 4a shows the lamination stack and 4b shows the rolled ribbon concept.

The stator 14 is composed of two identical structures placed on either side of the permanent magnet 16. Each side is composed of a series of coils 24 of generally trapezoidal shape, as shown in FIGS. 2 and 3, such that its section is identical to the pole section on the magnet 16, together with a hall effect sensing element 26, a printed circuit board and back iron plate 30 made out of soft magnetic material. The coils 24 and hall effect sensor 26 are secured on the printed circuit board formed as part of the annular support plate 30, which is arranged to make all coil-to-coil connections. In one version of the invention, the printed circuit board layer, indicated at 28, is immediately adjacent and formed on the surface of the back iron plate 30. In another version of the invention, the printed circuit board in a fiberglass ring arranged around the back iron plate 30. No iron material is placed in the center of the coils in order to avoid the reluctance cogging that would be detrimental to the brushless DC motor. This is sometimes described as a surface-wound design. The back iron plate 30 has a novel feature in the way it is laminated. A first preferred embodiment is shown in FIG. 4a and consists of a stack of at least 2 thin disc-like sheets of non-oriented soft magnetic material usually silicon steel. Each sheet of the stack contains m=9 equally distributed fine slots cut along a radius, leaving only a small continuous annular section adjacent to the inner diameter. In the stack of 2 or more sheets of soft magnetic material, the slots are staggered between sheets such as to allow a quasi-continuous path for the magnetic flux, but a quasi-open circuit for the eddy-current. With m being greater than the number of poles of the magnet, and the slots being fine, cogging is negligible.

Figure 4B:
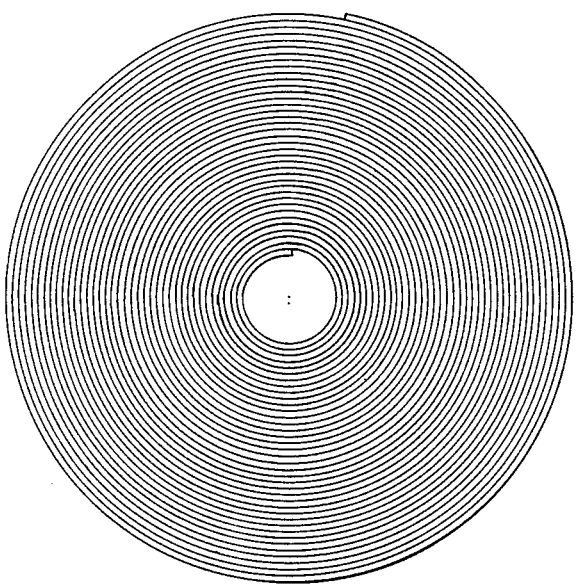

A second preferred embodiment is shown in FIG. 4b and involves back plates made of a narrow ribbon of very thin oriented soft magnetic material rolled up in a spiral and secured with a low viscosity penetrating glue. The ribbon must be thin enough to allow for the rolling operation to be performed without introducing excessive stresses which are detrimental to permeability. Silicon steel is usually the best compromise between performance and cost, but in demanding applications, metallic glass is an ideal choice because it is available in extremely thin ribbons.

The two identical stator assemblies, indicated as 14A and 14B, formed of the coils 24, sensing element 26, annular support plate 30 and the outer race portions of the ball bearings 22, are housed within generally cup shaped housing halves 32A, 32B of non magnetic material, assembled on opposite sides of the rotor 12, and connected for example by insulated connector pins 34 extending through apertures in the peripheral outer lip portions of the housing halves 32A, 32B. Spacer elements 36 are provided between the lower housing half 32B, as viewed in FIG. 1, and a printed circuit board 38 for the driver circuit of the motor, located below housing half 32B.

After assembly of the two stator halves 14A, 14B on either side of the rotor 12, the flux generated by each coil 24 axially crosses the air gap from iron plate 30 to magnet 16 and to iron plate 30 on the opposite side, finding a return path through each iron plate 30 to an adjacent coil 24 energized to show opposite polarity. The magnet height and the height of the coils is chosen in such a way that the operating point of the magnet in the air gap is in the neighborhood of the maximum energy product which usually occurs for magnet materials as earlier described at:

$$\frac{B}{H} = \frac{\text{Magnet height}}{\text{Air gap}} = 1$$

The distribution of the windings 16 and hall effect sensors 26 into assemblies forming two identical stator halves 14A, 14B provides a novel configuration which greatly facilitates ease of manufacture. This is accomplished in the following way:

In a motor as described, presenting p phases, and N pair of poles on the magnet, the windings 24 must be distributed such that an angle of (2/NP) appears between any two adjacent coils 24 of different phases. The maximum number of coils per stator half is then:

$$2\frac{2\pi}{2\frac{2\pi}{2N} + \frac{2\pi}{Np}} = \frac{2Np}{p+1}$$

This formula applies to p>2. For p=2, we have:

$$2\frac{2\pi}{2\frac{2\pi}{2N} + \frac{2\pi}{4N}} = \frac{8N}{5}$$

This leads to the following practical cases:

| Maximum Number of coils | N | 1 | 2 | 3 | 4 | 5 | 6 |
|---|---|---|---|---|---|---|---|
| 2 phases | | 1 | 3 | 4 | 6 | 8 | 9 |
| 3 phases | | | 3 | | 6 | | 9 |

In motors with a large radius, this construction can be used and the hall sensors can be placed in the adequate location, inside the coils or between the coils. In smaller motors, when the size of the hall effect sensor becomes similar to the size of the coils, then some coils have to be left out in order to provide room for the hall element. It is then better to optimize the number of coils using:

$$\frac{2\pi}{\frac{2\pi}{2N}+\frac{2\pi}{Np}} = \frac{2Np}{p+2} \text{ for } p > 2 \text{ and:}$$

$$\frac{2\pi}{\frac{2\pi}{2N}+\frac{2\pi}{4N}} = \frac{4N}{3} \text{ for } p = 2$$

This leads to the following practical cases:

| Maximum number of coils by default | N | 1 | 2 | 3 | 4 | 5 | 6 |
|---|---|---|---|---|---|---|---|
| 2 phase | | 1 | 2 | 4 | 5 | 6 | 8 |
| 3 phase | | | 3 | | 6 | | |

Figure 5:
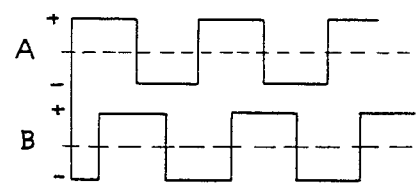
FIG. 5 is a waveform diagram indicating phase distributions for phase A and phase B as described hereinafter; and, FIG. 6 is a drive circuit which will reduce audible noise as described hereinafter.

The arrangement herein described used 2 phases, N=4, and 5 coils per stator half which is believed novel and non-obvious. The prior art practice has been to use an even number of coils per stator half such as it would be obvious to separate the coils into 2 phases. In the preferred embodiment herein described, the phase distribution will include two coils 24 of phase A, three coils 24 and hall effect sensor 26 of phase B on one side, two coils 24 of phase B, three coils 24 and hall effect sensor 26 of phase A on the other side. The two halves 14A, 14B are laid out exactly identical, but are shifted in angular orientation during assembly of the motor to achieve the proper phase line-up. All coils belonging to one phase will then be exactly facing a pole on the magnet. All coils of the other phase will be shifted by 90° electrical angle. The dissymetry in each half stator does not create axial shaft movements, if all coils are energized at a time relation, in the fashion shown in the energizing time diagram of FIG. 5. Such a commutation sequence is very commonly used.

The advantage of the above-described combination with the number of pairs of magnet poles N=4, and with five coils per stator side becomes clear upon consideration of the following optimization factors. Manufacturing cost being always a primary consideration, the number of coils should remain as low as possible although technically it would be ideal to have a high number of pole pairs and a high number of coils. The trapezoidal shaped coil has 2 active portions along a radius which generate torque and 2 passive portions along a circumference which merely assure a continuous electrical circuit. It is advantageous to keep the passive portions short to reduce resistance and $i^2R$ losses. From a manufacturing standpoint it is advantageous to design the coil as close to circular as possible. With N=4 and 5 coils, the shape of the coil is acceptable for winding at production rates.

With N=3 and 4 coils per stator half, each coil becomes more longitudinal, covering a 90 degree sector and making winding more difficult. N=4 represents therefore an optimum between what is required to create a performing product and what is necessary to manufacture the product economically.

Figure 6:
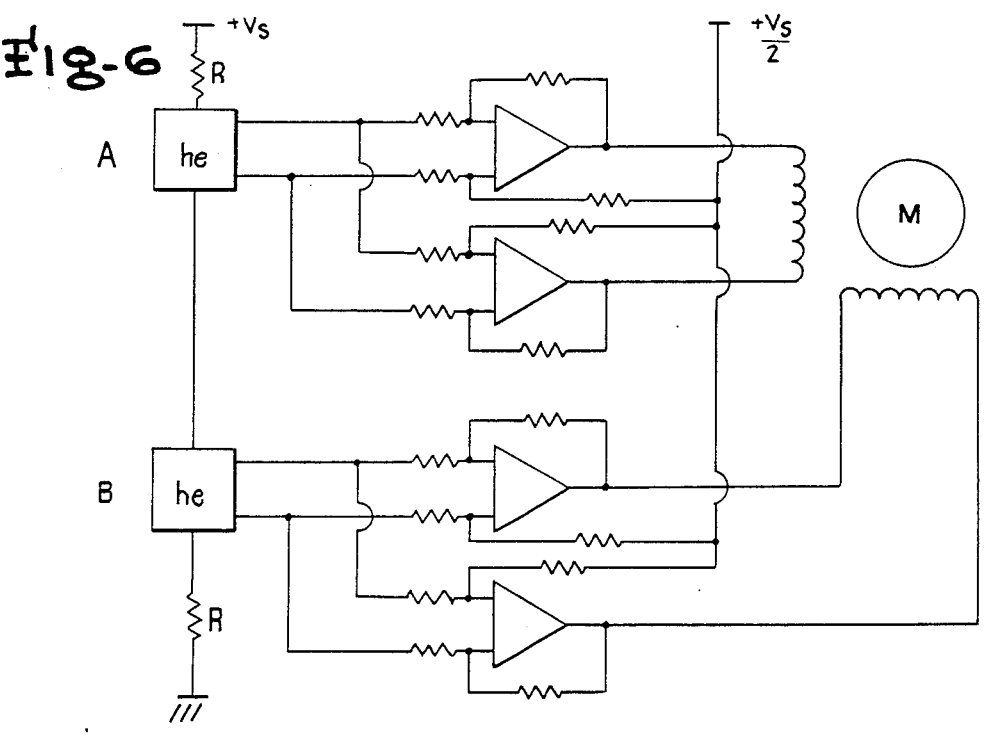

The hall effect sensors used to insure proper commutation of the two phases without the use of brushes have a linear output rather than a more usual switching output. The output voltage in such a hall effect element follows linearly the flux density generated by the magnet poles passing by and is therefore periodic and quasi-sinusoidal. This signal is amplified for each phase through the power amplifier shown in FIG. 6 and delivered to the windings. Its effect will be to turn on and off the current in the windings in a more progressive fashion, therefore reducing the micro-vibrations of the wires within the coil. As these micro-vibrations are transferred to the back iron plate and the housing, they are the main cause for audible noise.

While one particular embodiment of the present invention has been specifically shown and described, it will be apparent to those skilled in the art that other modifications may be employed and it is intended that these are embraced within the scope of the invention herein described and the appended claims.

I claim:

1. An axial air gap sub-fractional horsepower brushless DC motor of the pancake type for use with electronic computers and the like, comprising a rotor assembly including a disc-like permanent magnet of annular cylindrical configuration concentric with a center axis, a shaft concentric with said axis, and magnet supporting means secured to the shaft and coupled to the permanent magnet in the region adjacent the inner diameter edge portion thereof supporting the permanent magnet rigidly in a plane perpendicular to said center axis, the permanent magnet having a plurality of pairs of magnetic poles of alternating polarity and axially magnetized, a stator formed of two identical stator component sub-assemblies located on opposite sides of the permanent magnet in flanking relation to said permanent magnet with the permanent magnet sandwiched therebetween; said stator component sub-assemblies each including a thin disc-like annular backing plate member made of laminated soft magnetic material, a plurality of coils supported thereon of generally trapezoidal shape arranged in a circular path concentric with said axis, and a hall effect sensing element located along said circular path between one pair of circumferentially adjacent coils, and circuit means carried by said plate member providing coil-to-coil connections; a pair of generally cup shaped housing halves of non-magnetic material and of similar configuration assembled on opposite sides of the rotor and the pair of identical stator component sub-assemblies for encasing the rotor and said stator component sub-assemblies therein, and circuit means assembled thereon providing a driver circuit for the motor, the motor being arranged to be multiphase, and the two stator component sub-assemblies being shifted circumferentially in angular orientation relative to each other whereby coils belonging to one phase face a pole on the permanent magnet and coils belonging to another phase are shifted by an appropriate electrical angle relative thereto.

2. A brushless DC motor as defined in claim 1, wherein the supporting means for the annular permanent magnet comprises a pair of like gripping flange members encircling and secured to said shaft collectively defining an outwardly facing cylindrical groove receiving therein the inner diameter edge portion of said permanent magnet with opposite sides of said groove tightly gripping confronting surface portions of the permanent magnet.

3. A brushless DC motor as defined in claim 2, wherein said housing halves include ball bearing assemblies each having an inner race secured to said shaft, and said motor includes a spacer located between each of said gripping flange members and the inner race of the ball bearing assemblies to minimize axial play and locate the permanent magnet in the middle of the air gap between the permanent magnet and the stator component sub-assemblies.

4. A brushless DC motor as defined in claim 1, wherein the laminated backing plate member is made of a stack of at least 2 thin disc like sheets of non-oriented soft magnetic material, each sheet having fine slots cut along a radius, leaving the inner annular portion as supporting member, said slots being distributed equally along the circumference and in greater number than the number of poles on the permanent magnet, such as to reduce generated eddy-currents without creating an appreciable amount of cogging torque, the slots being staggered between sheets of soft magnetic material in order to provide a continuous path for the magnetic flux.

5. A brushless DC motor as defined in claim 1, wherein the laminated backing plate member is made of a narrow ribbon of very thin oriented soft magnetic material, rolled up in a spiral and secured with glue.

6. A brushless DC motor as defined in claim 1, wherein the hall effect sensing element has a linear output where voltage linearly follows flux density, such as the waveform of said voltage is quasi-sinunoidal and can be amplified to provide current to the windings free of sharp transitions, therefore reducing audible noise.

7. A brushless DC motor as defined in claim 1, wherein the number of phases is two, where coils belonging to one phase face a pole on the permanent magnet and coils of the other phase are shifted by a 90° electrical angle relative thereto, wherein the number of said pairs of magnetic poles is four and there are five of said coils in each of said stator component sub-assemblies.

8. A brushless DC motor as defined in claim 2, wherein the number of phases is two, where coils belonging to one phase face a pole on the magnet and coils of the other phase are shifted by a 90° electrical angle relative thereto, wherein the number of said pairs of magnetic poles is four and there are five of said coils in each of said stator component sub-assemblies.

9. A brushless DC motor as defined in claim 3, wherein the number of phases is two, where coils belonging to one phase face a pole on the magnet and coils of the other phase are shifted by a 90° electrical angle relative thereto, wherein the number of said pairs of magnetic poles is four and there are five of said coils in each of said stator component sub-assemblies.

* * * * *